United States Patent [19]

Ramos

[11] Patent Number: 5,717,174
[45] Date of Patent: Feb. 10, 1998

[54] ELEVATOR BRAKE DROP SILENCING APPARATUS AND METHOD

[75] Inventor: Julio C. Ramos, Lake Hiawatha, N.J.

[73] Assignee: Inventio AG, Hergiswil NW, Switzerland

[21] Appl. No.: 643,460

[22] Filed: May 8, 1996

[51] Int. Cl.$^6$ .............................. B66B 1/32; B66B 1/34
[52] U.S. Cl. ...................... 187/288; 188/1.112; 187/292
[58] Field of Search .................................. 187/351, 352, 187/288, 292; 188/1.112

[56] References Cited

U.S. PATENT DOCUMENTS

| | | | |
|---|---|---|---|
| 4,368,501 | 1/1983 | Gingrich | 361/152 |
| 4,739,969 | 4/1988 | Eckersley et al. | 254/378 |
| 5,153,389 | 10/1992 | Nomura | 187/108 |
| 5,247,140 | 9/1993 | Iwasa et al. | 187/108 |
| 5,255,760 | 10/1993 | Lamb et al. | 189/1.11 |
| 5,402,863 | 4/1995 | Okumura et al. | 187/288 |
| 5,419,415 | 5/1995 | Lamb et al. | 188/1.11 |

FOREIGN PATENT DOCUMENTS

| | | | |
|---|---|---|---|
| 3934492 | 4/1990 | Germany. | |
| 3-249075 | 11/1991 | Japan | 187/288 |
| 4-153174 | 5/1992 | Japan | 187/288 |
| 2236623 | 4/1991 | United Kingdom | 187/288 |

OTHER PUBLICATIONS

Patent Abstracts of Japnan; No. 07002441; Mizuno Kimimoto, Ishi Toshiaki, Jan. 6, 1995.

*Primary Examiner*—Robert Nappi
*Attorney, Agent, or Firm*—William J. Clemens

[57] ABSTRACT

An apparatus and a method for controlling an elevator brake assembly (1) includes a control circuit (CM) for selectively connecting an electrical power supply (28) to a brake armature coil (9) to move an armature plate (4) between a brake actuated rest position against a brake friction lining (5) and a brake released hold position adjacent a brake housing (2). The control circuit (CM) applies a first voltage to the coil (9) to move the armature plate (4) against a force applied by a spring (3) from the rest position to the hold position in response to a signal on a brake pick signal line (BP). The control circuit (CM) applies a second voltage to the coil (9) to control the movement of the armature plate (4) by the spring (3) from the hold position to the rest position in accordance with a predetermined velocity versus distance curve to achieve minimum impact on the lining (5) at the rest position. A position sensor (11,12) is moved by the armature plate (4) to generate an actual position signal for adjusting the second voltage and a microswitch (10) is actuated by the armature plate (4) to signal the hold position. The control circuit (CM) self-calibrates by minimizing the position signal at the rest position and adjusting the velocity versus distance curve based upon the position signal at the hold position.

19 Claims, 3 Drawing Sheets

ELEVATOR BRAKE DROP SILENCING APPARATUS AND METHOD

BACKGROUND OF THE INVENTION

The present invention relates generally to an apparatus for controlling an elevator brake and, in particular, to an apparatus for silencing an elevator brake assembly during a brake drop condition.

On one hand, elevator brakes must quickly stop the elevator car and counterweight in an emergency condition and, on the other hand, must quietly operate during normal stopping so that elevator brake sounds generated in the machinery area do not have a disturbing effect in the elevator car. Typically, elevator brakes are actuated by a spring, and released by an electromagnetic field generated by a brake armature coil working in opposition to the spring force. If the voltage applied to the brake armature coil is switched off, the electromagnetic field collapses and the brake armature plate is forced by the spring to impact with friction linings and a backplate of a drive motor. Upon contact, disturbing impact sounds are generated. A solution to the sound problem has been to install devices which oppose free collapse of the field generated by the brake armature coil. These measures result in a softer impact of the armature plate and thereby reduce the impact sounds. However, a disadvantageous of this solution is that the response time of the brake is prolonged, which is not acceptable in an emergency stop situation.

SUMMARY OF THE INVENTION

The present invention concerns an apparatus for controlling a brake assembly for an elevator drive. The brake assembly includes a brake housing, an armature plate mounted on the brake housing and movable along a path of travel between a brake actuated rest position and a brake released hold position, a spring mounted in the brake housing and coupled to the armature plate for biasing the armature plate from the hold position to the rest position with a predetermined spring force and a brake armature coil mounted in the brake housing for generating an electromagnetic field to overcome the spring force and move the armature plate from the rest position to the hold position. A position sensor is connected to an armature plate for generating a position signal representing an actual position of the armature plate along a path of travel of the armature plate between the rest position and the hold position and a control means is connected to the position sensor and to the brake armature coil. The control means is responsive to a brake pick signal generated by an elevator control for applying a first voltage from a power supply to the brake armature coil to generate an electromagnetic field and move the armature plate between the rest position and the hold position, and the control means is responsive to the absence of the brake pick signal and is responsive to the position signal for applying a second voltage from the power supply to the brake armature coil to selectively vary the electromagnetic field to permit the spring to move the armature plate between the hold position and the rest position in accordance with a predetermined velocity versus distance curve.

The apparatus includes a switch means attached to the brake housing for actuation by the armature plate in the hold position and connected to the control means for generating a brake released signal upon actuation by the armature plate. The control means is responsive to the brake released signal for applying a holding voltage from the power supply to the brake armature coil having a magnitude less than the first voltage to maintain the armature plate in the hold position. The control means applies the second voltage with a magnitude minimizing an impact of the armature plate on a friction lining coupled to a drive motor shaft of an elevator drive at the rest position. The control means also is responsive to an emergency stop signal generated by the elevator control for applying a third voltage from the power supply to the brake armature coil to generate an electromagnetic field which assists the spring to move the armature plate from the hold position to the rest position.

The control means includes a potentiometer for generating an offset signal and a differential amplifier having a first input connected to the position sensor for receiving the position signal and a second input connected to the potentiometer for receiving the offset signal. The differential amplifier generates a difference signal representing a difference between the position signal and the offset signal and the control means automatically adjusts the potentiometer when the armature plate is in the rest position to minimize a magnitude of the difference signal. The potentiometer is a digital potentiometer and the control means includes a microprocessor connected to the potentiometer for adjusting a magnitude of the offset signal and an analog/digital converter connected between the differential amplifier and the microprocessor for generating the difference signal in digital form to the microprocessor.

The control means further includes an interface and isolation circuit connected between the microprocessor and the brake pick signal line and a power switching circuit connected between the interface and isolation circuit and the brake armature coil. The power switching circuit includes a plurality of power transistors connected between the brake armature coil and the power supply and each of the transistors has a base connected to the interface and isolation circuit by one of a plurality of lines for responding to control signals generated by the microprocessor to apply the first and second voltages to the brake armature coil.

The control means subtracts a magnitude of the difference signal generated at the rest position of the armature plate from a magnitude of the difference signal generated as the armature plate moves between the rest position and the hold position. The control means utilizes previously generated values of the position signal at the hold and rest positions of the armature plate as beginning and ending points respectively of the predetermined velocity versus distance curve during a subsequent movement of the armature plate from the hold position to the rest position.

The method according to the present invention comprises the steps of: controlling a first voltage applied to the brake armature coil to selectively apply a controlling force to the armature plate as the spring moves the armature plate between the hold position and the rest position along a path of travel, controlling a second voltage applied to the brake armature coil to minimize an impact of the armature plate on the friction lining when the spring moves the armature plate from the hold position to the rest position along the path of travel, generating a reference curve for the movement of the armature plate (4) from the hold position to the rest position along the path of travel, generating a position signal representing an actual position of the armature plate on the path of travel, comparing the position signal with the reference curve to obtain a difference, and adjusting the second voltage applied to the brake armature coil to minimize the difference. The method also includes a step of minimizing a magnitude of the position signal when the armature plate is in the rest position.

The invention avoids the disadvantages of the well-known prior art equipment and reduces brake noise while the response time of the brake is minimized.

Another advantage of the present invention is that mechanical tolerances, different mechanical positions of the brake and the wear of the brake friction lining are automatically compensated for at braking and thereby an equal braking of the elevator car and the counterweight is guaranteed at all times.

A further advantageous of the present invention is that no special measures need be taken to isolate braking sounds generated in the machinery area.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
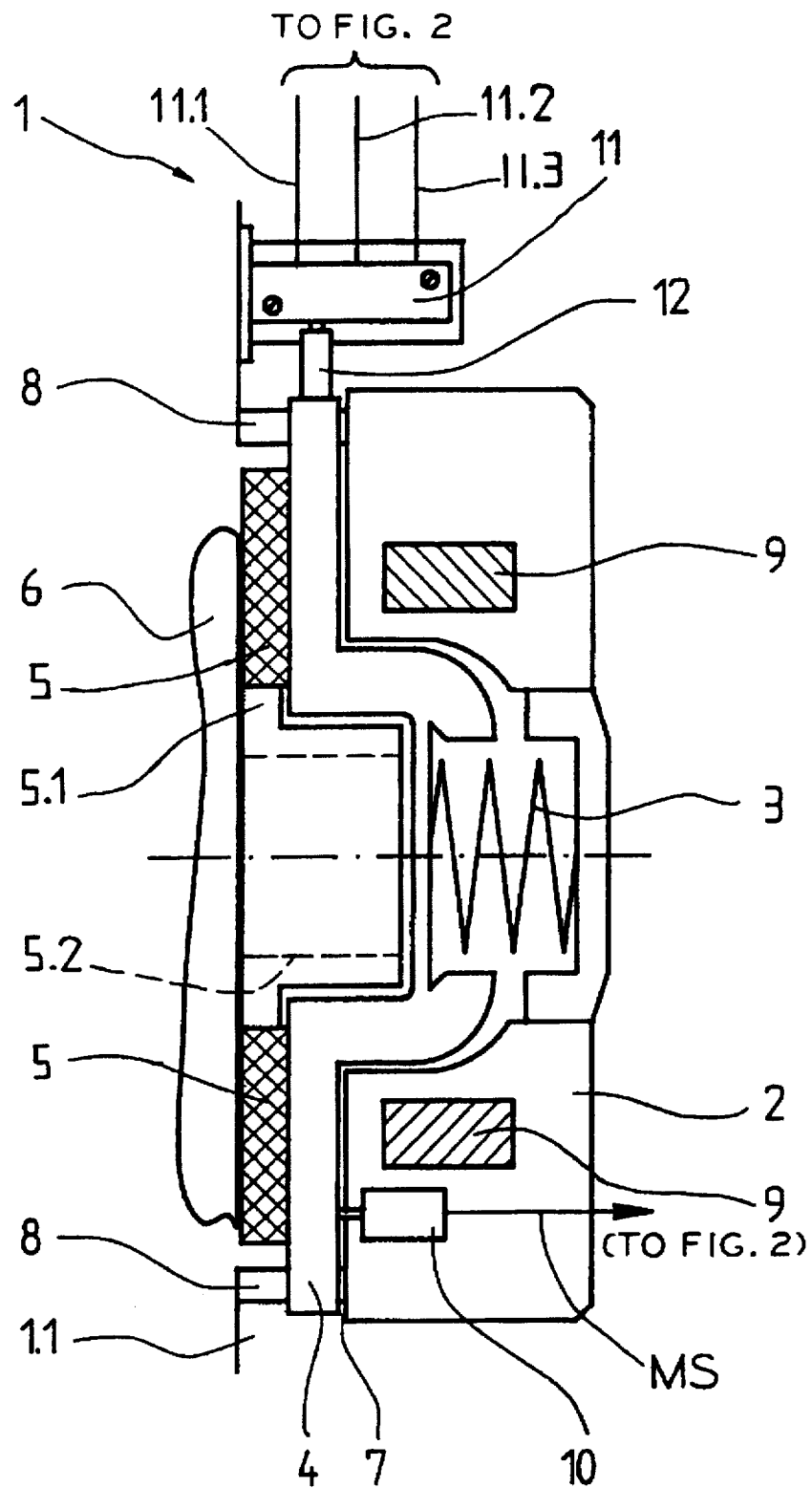
FIG. 1 is a schematic side elevation view of an elevator brake with a brake drop silencing apparatus in accordance with the present invention.

There is shown in the FIG. 1 a supporting framework 1.1 on which a brake assembly 1 is mounted. The framework can be, for example, a frame of a drive motor (not shown) for an elevator car. The brake assembly 1 has an outer, generally annular housing 2 in which is mounted a spring 3 which is coupled to and acts upon a movable armature plate 4 also located in the housing. A friction lining 5 faces a side of the armature plate 4 opposite the spring 3 and is attached to a splined hub 5.1 mounted on a shaft 5.2 of the motor for rotation therewith. The spring 3 generates a predetermined force which moves the armature plate 4 against the friction lining 5 and forces the friction lining against a facing surface of a backplate or brake disk 6 of the motor. Thus, the motor is braked as the friction lining 5 is pressed between the non-rotating surfaces of the armature plate 4 and the backplate 6. In the brake actuated rest position shown in the FIG. 1, a significant air gap 7 exists between the facing surfaces of the brake housing 2 and the armature plate 4.

The armature plate 4 is slidably mounted on a plurality of pins or bolts 8 by which the housing 2 is attached to the framework 1.1. Disposed in the housing 2, adjacent the air gap 7, is a brake armature coil of 9 which is normally deactivated. Upon activation of the brake armature coil 9, an electromagnetic field is generated which attracts the armature plate 4 from the brake actuated rest position shown in the FIG. 1 toward the brake housing 2. The electromagnetic field counteracts the force applied by the spring 3 to move the armature plate 4 away from the friction lining 5 thereby releasing the brake and permitting the motor shaft 5.2 to rotate. The armature plate 4 moves along a path of travel defined by the bolts 8 to a brake released hold position (not shown) adjacent the housing 2. A second brake assembly (not shown), similar to the brake assembly 1 can be provided and mounted on the same end or at the opposite end of the motor shaft 5.2. Although a pressure plate type of brake is shown, other types of brakes can be used with the present invention such as disk brakes or drum brakes.

Movement of the armature plate 4 into the brake released condition brings the armature plate into contact with and actuates a microswitch 10 attached to the housing 2. Thus, the microswitch 10 can generate a brake released signal at an output connected to a line MS which signal indicates whether the brake assembly 1 is in the brake actuated condition or in the brake released condition. A potentiometer 11 is mounted on the framework 1.1 and has a sliding contact 12 which is coupled to move with the armature plate 4. A pair of leads 11.1 and 11.3 are electrically connected to opposite ends of a resistor in the potentiometer and a lead 11.2 is electrically connected to a sliding contact 12 in electrical contact with the resistor. Thus, the output resistance of the potentiometer 11, as measured between the lead 11.2 and either of the leads 11.1 and 11.3, is linearly proportional to the position of the armature plate 4 relative to the backplate 6 and to the width of the air gap 7.

Figure 2:
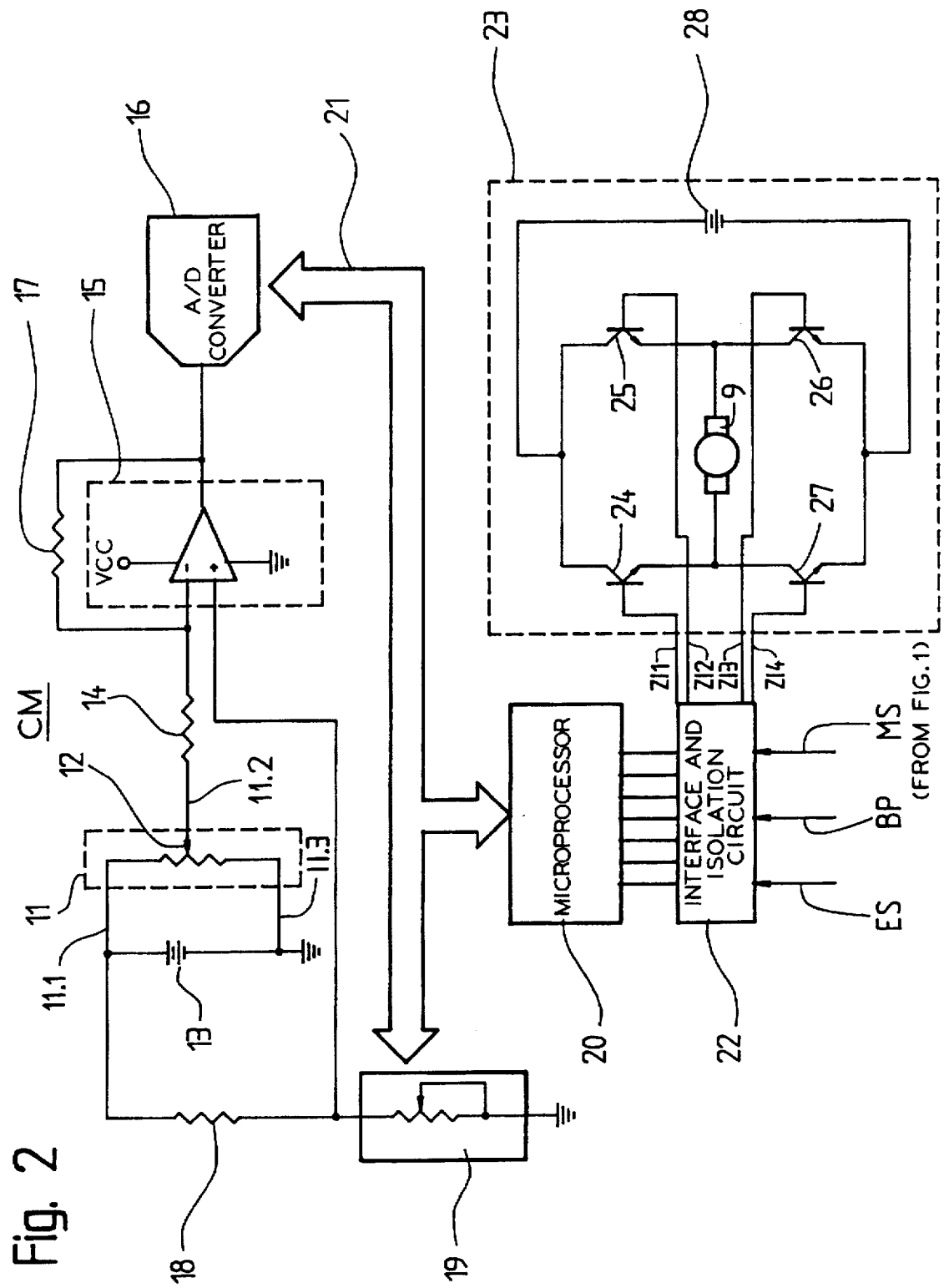
FIG. 2 is schematic block diagram of a control circuit for the apparatus shown in the FIG. 1.

There is shown in the FIG. 2 a brake control circuit CM for controlling the electromagnetic field generated by the coil 9 in the brake assembly 1. Opposite ends of the resistor of the potentiometer 11 are connected to positive polarity and negative polarity terminals of a reference voltage source 13 by the leads 11.1 and 11.3 respectively. The negative polarity terminal of the source 13 is connected to the circuit ground potential. The sliding contact 12 of the potentiometer 11 is connected by the lead 11.2 through a resistor 14 to an inverting input of a differential amplifier 15 which has an output connected to an analog input of an analog/digital converter 16. The voltage on the line 11.2 is a position signal representing the actual position of the armature plate 4. The output of the amplifier 15 also is connected through a resistor 17 to the inverting input. The relationship of the resistance values of the resistor 17 and the resistor 14 is proportional to the amplification factor of the differential amplifier 15. A non-inverting input of the differential amplifier 15 is connected to a junction of one end of each of a high voltage resistor 18 and a digital potentiometer 19. The digital potentiometer 19 operates in a manner similar to a resistor and switch network. The resistor 18 has another end connected to the positive polarity terminal of the reference voltage source 13 and the digital potentiometer 19 has another end connected to the circuit ground potential.

The value of the resistance of the potentiometer 19 is controlled by a microprocessor 20 connected to the potentiometer by a bus 21. The microprocessor 20 generates control signals at an input/output over the bus 21 to increase or decrease the resistance between the non-inverting input of the amplifier 15 and the circuit ground. The portion of the voltage generated by the source 13 which appears across the potentiometer 19 is an offset voltage signal for the differential amplifier 15 having a magnitude determined by the microprocessor 21. For example, when the armature plate 4 is in the brake actuated rest position, the microprocessor 20 changes the offset voltage by controlling the digital potentiometer 19 until a difference signal generated at an output of the analog/digital converter 16 connected to the bus 21 has a minimal value. This adjustment procedure is automatically performed by the microprocessor 20 periodically to permit the amplifier 15 to have a larger gain amplification factor for greater position tracking resolution of the potentiometer 11.

The amplifier gain can be automatically controlled if the resistor 17 is replaced by a digital potentiometer, similar to the potentiometer 19, controlled by the microprocessor 20. According to the difference in magnitude of the voltage at the contact 12 between the brake actuated rest position and the brake released hold position, the microprocessor 20 can increase the gain amplification factor at small values of the air gap 7 and decrease the gain amplification factor at large air gap values. Thus, the control circuit optimizes itself.

An interface and isolation circuit 22 has an input/output connected to another input/output of the microprocessor 20, an input connected to the microswitch 10 via the line MS and another input connected to an elevator control (not shown) via a pair of lines ES and BP. The interface and isolation circuit 22 also has outputs connecting the microprocessor 20 with inputs to a brake armature coil control power switching circuit 23 via a plurality of lines ZI1, ZI2, ZI3 and ZI4. The line ZI1 is connected to a base of an NPN power transistor 24. The line ZI2 is connected to a base of an NPN power transistor 25 having a collector connected to a collector of the transistor 24. The line ZI3 is connected to a base of an NPN power transistor 26 having a collector connected to an emitter of the transistor 25 and one lead of the coil 9. The line ZI4 is connected to a base of an NPN power transistor 27 having a collector connected to an emitter of the transistor 24 and another lead of the coil 9 and an emitter connected to an emitter of the transistor 26. A power supply 28 has a positive polarity terminal connected to the collectors of the transistors 24 and 25 and a negative polarity terminal connected to the emitters of the transistors 26 and 27. Thus, the power transistors 24 through 27 are connected in a full wave bridge circuit to control both the amount of current supplied to the coil 9 by the power supply 28 as well as the direction of current flow through the coil.

When the brake is to be released, the elevator control generates a brake pick or release signal on the line BP connected to the interface 22. The microprocessor 20 responds to the brake pick signal by generating control signals on the lines ZI1 and ZI3 to turn on the transistors 24 and 26 respectively thereby applying a first voltage to and permitting current from the power supply 28 to flow through the brake armature coil 9. The electromagnetic field generated by the coil 9 attracts the armature plate 4 and overcomes the force of the spring 3 to move the armature plate out of contact with the friction lining 5 thereby releasing the brake. Upon reaching a predetermined position adjacent the brake housing 2, the armature plate 4 contacts and actuates the microswitch 10 which generates a brake released signal on the line MS. Since the electromagnetic field required to hold the armature plate 4 in the brake released position is less than the electromagnetic field required to move the armature plate from the brake actuated position, the microprocessor 20 responds to the brake released signal by reducing the first voltage applied to the coil 9 to a holding voltage level. Brake coils typically have about a thirty percent difference between the pick and hold voltages. Thus, the microprocessor begins pulsing the control signals on the lines ZI1 and ZI3 to generate an average voltage across the coil 9 sufficient to hold the armature plate 4 in the brake released position. The signals from the analog/digital converter 16 representing the rest position (brake actuated) of the armature plate 4 and the hold position (brake released) are compared by the microprocessor 20 to establish the scaling for the control means.

When the brake pick signal is removed from the line BP, the microprocessor 20 monitors the position of the armature plate 4 through the position signal generated by the potentiometer 11 and the analog/digital converter 16 and adjusts a second voltage applied to the coil 9 accordingly to maintain the desired velocity versus distance curve between the hold and the rest positions of the armature plate. When the elevator control generates an emergency stop signal on the line ES, the microprocessor 20 responds by switching off the transistors 24 and 26 so that the spring 3 moves the armature plate 4 into engagement with the friction linings 5 for braking the motor. In the emergency stop mode of operation, the spring 3 can be assisted by generating control signals from the microprocessor 20 on the lines ZI2 and ZI4 to turn on the transistors 25 and 27 respectively thereby applying a third voltage and generating current flow through the coil 9 in the opposite direction. The coil 9 generates an electromagnetic field which repels the armature plate 4 to move it with higher speed into contact with the friction linings 5.

As described above, the brake assembly 1 according to the present invention self-calibrates and compensates for differences in component tolerances, changes in temperature, wear of the friction lining 5 and inaccuracies in the mechanical adjustments of the brake components. In the brake actuated position of the armature plate 4, the microprocessor 20 changes the resistance value of the digital potentiometer 19 and consequently the offset voltage generated to the differential amplifier 15 until the voltage generated at the output the analog/digital converter 16 is minimized. Any small output from the converter 16 is subtracted in the microprocessor 20. When the microswitch 10 is actuated by the armature plate 4, the value of the output voltage of the analog/digital converter is stored by the microprocessor 20 so that during a subsequent brake drop, the preceding braking movement of the armature plate can be compared and consequently the impact with the brake lining 5 can be optimized. A first braking movement of the armature plate 4 occurs only under operation by the spring 3 which is utilized as a baseline by the microprocessor 20 for a subsequent operation. The position signals at the rest and hold positions are used by the microprocessor 20 to generate the velocity versus distance curve for the next operation. Each subsequent operation of the brake causes the microprocessor 20 to recalibrate so as to achieve a nearer to zero impact speed with the friction linings as compared to the previous operation.

Figure 3:
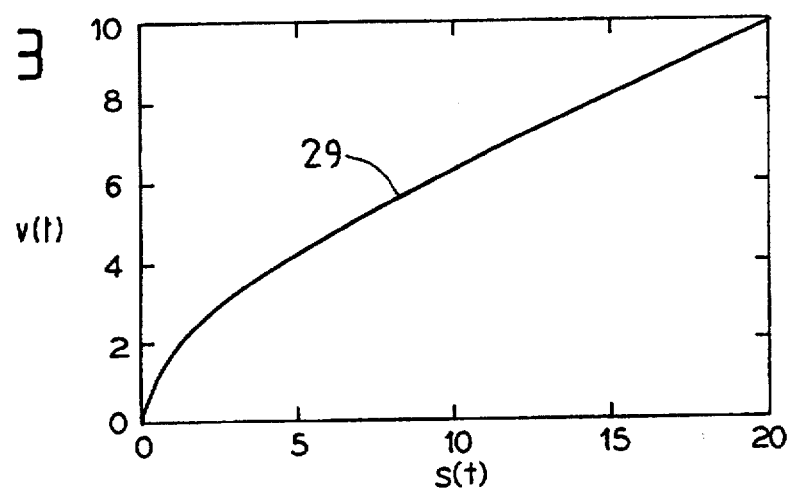
FIG. 3 is a plot of speed versus position for the armature plate of the apparatus shown in the FIG. 1.

A plot 29 of speed "v(t)" versus position s(t) of the armature plate 4 during brake actuation without any electromagnetic field generated by the coil 9 is shown in the FIG. 3. It is assumed that the acceleration is constant since the spring force generated by the spring 3 is constant over the relatively small air gap 7. The spring 3 moves the armature plate 4 to the impact with the brake lining 5 and with the backplate 6 with a constant acceleration. The curve depicted in the FIG. 3 is defined according to the following movement equations:

$$s(t) = \tfrac{1}{2} \bullet a \bullet t^2$$

$$v(t) = (2 \bullet a \bullet s(t))^{1/2}$$

in which "s" is the position, "a" is the acceleration, "v" is the speed and "t" is the time.

Figure 4:
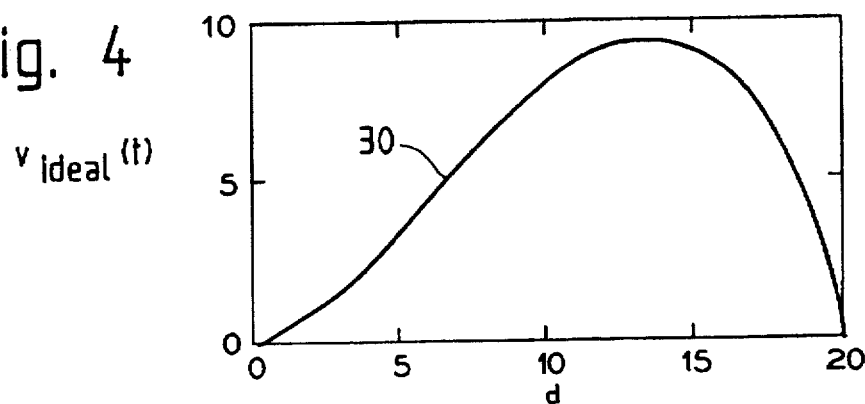
FIG. 4 is a plot of ideal speed versus distance for the armature plate of the apparatus shown in the FIG. 1.

There is shown in the FIG. 4 a plot 30 of an ideal speed $v_{ideal}(t)$ versus distance "d" for the armature plate 4 in which the speed increases and, just before the impact, sharply reduces to a low speed near zero. The plot shown in the FIG. 4 can be defined, for example, by a polynomial function of the form:

$$v_{ideal}(s) = -s^3 + 4 \bullet s^2$$

In the FIG. 4, the maximum value of "d" is equal to the width of the air gap 7 shown in the FIG. 1.

The microprocessor 20 needs only to use this simple polynomial speed/distance reference curve to generate the control signals on the control signal lines ZI1, ZI2, ZI3 and ZI4. If the speed of movement of the armature plate 4 falls below the reference speed, the duty cycle of the power switching circuit 23 is increased so that the electromagnetic field generated by the brake armature coil 9 is increased in support of the spring force. If the speed of movement of the armature plate 4 exceeds the reference speed, the duty cycle of the power switching circuit 23 is decreased so that the electromagnetic field generated by the brake armature coil 9 is decreased.

Figure 5:
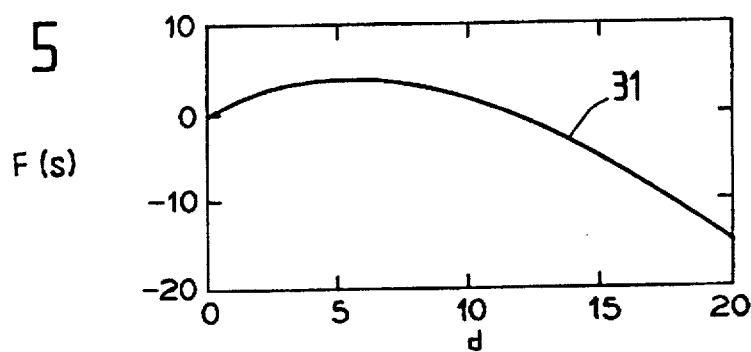
FIG. 5 is a plot of combined force versus distance for the armature plate of the apparatus shown in the FIG. 1.

There is shown in the FIG. 5 a plot 31 of force "F(s)" versus distance "d" of the combined spring force generated by the spring 3 and electromagnetic force generated by the coil 9 acting on the armature plate 4. The approximate net force applied to the armature plate 4 can be defined by acceleration or the derivative of "$v_{ideal}(s)$" according to the equations:

$$F(s) = d/ds(-s^3 + 4 \bullet s^2)$$

$$F(s) = -3 \bullet s^2 + 8 \bullet s$$

Since this net force includes the constant spring force, the constant portion can be subtracted to leave the required controlling electromagnetic force curve. The controlling force "$F_{magnet}(s)$" versus distance "d" plot 32 is shown as a solid curve in the FIG. 6. The electromagnetic force can be defined by the equation:

$$F_{magnet}(s) = F_{feder} - F(s)$$

Figure 6:
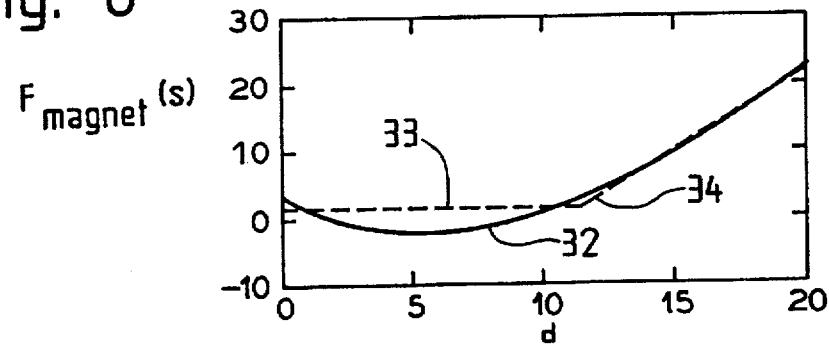
FIG. 6 is a plot of controlling force versus distance for the coil of the apparatus shown in the FIG. 1.

The controlling force $F_{magnet}(s)$ curve can be approximated by linear segments shown as dashed lines 33 and 34 in the FIG. 6 which simplifies the control instructions required for the microprocessor 20.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for controlling a brake assembly for an elevator drive, the brake assembly (1) including a brake housing (2), an armature plate (4) mounted on the brake housing (2) and movable along a path of travel between a brake actuated rest position and a brake released hold position, a spring (3) mounted in the brake housing (2) and coupled to the armature plate (4) for biasing the armature plate (4) from the hold position to the rest position with a predetermined spring force and a brake armature coil (9) mounted in the brake housing (2) for generating an electromagnetic field to overcome the spring force and move the armature plate (4) from the rest position to the hold position, comprising:

a position sensor (11,12) adapted to be connected to an armature plate (4) of an elevator drive brake assembly (1) for generating a position signal representing an actual position of the armature plate (4) along a path of travel of the armature plate (4) between a rest position and a hold position; and a control means (CM) connected to said position sensor (11,12) whereby when said position sensor (11,12) is connected to the armature plate (4) of the elevator brake assembly (1) and said control means (CM) is connected to a brake armature coil (9) of the brake assembly (1), said control means (CM) is responsive to a brake pick signal generated by an elevator control on a brake pick signal line (BP) for applying a first voltage from a power supply (28) to the brake armature coil (9) to generate an electromagnetic field and move the armature plate (4) between the rest position and the hold position, and said control means (CM) is responsive to the absence of the brake pick signal and is responsive to said position signal for applying a second voltage from the power supply (28) to the brake armature coil (9) to selectively vary the electromagnetic field to permit a spring (3) in the brake assembly (1) to move the armature plate (4) between the hold position and the rest position in accordance with a predetermined velocity versus distance curve (30).

2. The apparatus according to claim 1 including a switch means (10) attached to the brake assembly (1) for actuation by the armature plate (4) in the hold position and being connected to said control means (CM) by a brake released signal line (MS), said switch means (10) generating a brake released signal on said brake released signal line (MS) upon actuation by the armature plate (4) and said control means (CM) being responsive to said brake released signal for applying a holding voltage from the power supply (28) to the brake armature coil (9) having a magnitude less than said first voltage to maintain the armature plate (4) in the hold position.

3. The apparatus according to claim 1 wherein said control means (CM) applies said second voltage with a magnitude minimizing an impact of said armature plate (4) on a friction lining (5) coupled to a drive motor shaft (5.2) of an elevator drive at said rest position.

4. The apparatus according to claim 1 wherein said control means (CM) is responsive to an emergency stop signal generated by the elevator control on an emergency stop signal line (ES) for applying a third voltage from said power supply (28) to the brake armature coil (9) to generate an electromagnetic field which assists the spring (3) to move the armature plate (4) from the hold position to the rest position.

5. The apparatus according to claim 1 wherein said control means (CM) includes a potentiometer (19) for generating an offset signal and a differential amplifier (15) having a first input connected to said position sensor (11,12) for receiving said position signal and a second input connected to said potentiometer (19) for receiving said offset signal, said differential amplifier (15) generating a difference signal representing a difference between said position signal and said offset signal, said control means (CM) automatically adjusting said potentiometer (19) when the armature plate (4) is in the rest position to minimize a magnitude of said difference signal.

6. The apparatus according to claim 5 wherein said potentiometer (19) is a digital potentiometer and said control means (CM) includes a microprocessor (20) connected to said potentiometer (19) for adjusting a magnitude of said offset signal and including an analog/digital converter (16) connected between said differential amplifier (15) and said microprocessor (20) for generating said difference signal in digital form to said microprocessor (20).

7. The apparatus according to claim 6 wherein said control means (CM) includes an interface and isolation circuit (22) connected between said microprocessor (20) and said brake pick signal line (BP) and a power switching circuit (23) connected between said interface and isolation circuit (22) and the brake armature coil (9), said power switching circuit (23) including a plurality of power transistors (24,25,26,27) connected between the brake armature coil (9) and the power supply (28) and each having a base connected to said interface and isolation circuit (22) by one of a plurality of lines (ZI1,ZI2,ZI3,ZI4) for responding to control signals generated by said microprocessor (20) to apply said first and second voltages to the brake armature coil (9).

8. The apparatus according to claim 5 wherein said control means (CM) subtracts a magnitude of said difference signal generated at said rest position of the armature plate (4) from a magnitude of said difference signal generated as the armature plate (4) moves between the rest position and the hold position.

9. The apparatus according to claim 1 wherein said control means (CM) utilizes previously generated values of said position signal at the hold and rest positions of the armature plate (4) as beginning and ending points respectively of said predetermined velocity versus distance curve during a subsequent movement of the armature plate (4) from the hold position to the rest position.

10. The apparatus according to claim 1 wherein said control means (CM) approximates said predetermined velocity versus distance curve with straight lines segments approximating a controlling electromagnetic force versus distance curve obtained by differentiating said predetermined velocity versus distance curve and subtracting a predetermined spring force applied to the armature plate (4) by the spring (3).

11. An apparatus for braking an elevator drive comprising:

a brake housing (2);

an armature plate (4) mounted on said brake housing (2) and movable along a path of travel between a rest position and a hold position;

a spring (3) mounted in said brake housing (2) and coupled to said armature plate (4) for biasing said armature plate (4) from said hold position to said rest position with a predetermined spring force;

a position sensor (11,12) connected to said armature plate (4) for generating a position signal representing an actual position of said armature plate (4) along said path of travel;

a brake armature coil (9) mounted in said brake housing (2) for generating an electromagnetic field to overcome said spring force and move said armature plate (4) from said rest position to said hold position; and a control means (CM) connected to said brake armature coil (9) and said position sensor (CM), said control means (CM) being responsive to a brake pick signal generated by an elevator control on a brake pick signal line (BP) connected to said control means (CM) for applying a first voltage from a power supply (28) to said brake armature coil (9) to generate said electromagnetic field and move said armature plate (4) between the rest position and the hold position, and said control means (CM) being responsive to the absence of said brake pick signal and responsive to said position signal for applying a second voltage from the power supply (28) to said brake armature coil (9) to selectively vary said electromagnetic field to permit said spring (3) to move said armature plate (4) between the hold position and the rest position in accordance with a predetermined velocity versus distance curve.

12. The apparatus according to claim 11 wherein said control means (CM) includes a microprocessor (20), a digital potentiometer (19) connected to said microprocessor (20) for generating an offset signal, a differential amplifier (15) connected to said position sensor (11,12) for receiving said position signal and connected to said digital potentiometer (19) for receiving said offset signal, said differential amplifier (15) generating a difference signal representing a difference between said position signal and said offset signal, an analog/digital converter (16) connected between said differential amplifier (15) and said microprocessor (20) for generating said difference signal in digital form, an interface and isolation circuit (22) connected to said microprocessor (20) and to said brake pick signal line (BP) and a power switching circuit (23) connected between said interface and isolation circuit (22) and said brake armature coil (9) and connected to said power supply (28), said microprocessor (20) generating control signals through said interface and isolation circuit (22) to said power switching circuit (23) to apply said first and second voltages to said brake armature coil (9).

13. The apparatus according to claim 12 wherein said power switching circuit (23) includes four power transistors (24,25,26,27) connected in a full wave bridge circuit between said power supply (28) and said brake armature coil (9), each of said transistors (24,25,26,27) having a base connected to said interface and isolation circuit (22) for receiving said control signals.

14. The apparatus according to claim 11 including a switch means (10) attached to said brake housing (2) for actuation by said armature plate (4) in the hold position and being connected to said control means (CM) by a brake released signal line (MS), said switch means (10) generating a brake released signal on said brake released signal line (MS) upon actuation by the armature plate (4) and said control means (CM) being responsive to said brake released signal for applying a holding voltage from said power supply (28) to said brake armature coil (9) having a magnitude less than said first voltage to maintain the armature plate (4) in the hold position.

15. A method for controlling an elevator brake assembly (1), the brake assembly (1) having an armature plate (4) biased to a rest position against a friction lining (5) by a spring (3) in a brake actuated condition and a brake armature coil (9) for forcing the armature plate (4) to a hold position in a brake released condition, comprising the steps of:

a. controlling a first voltage applied to the brake armature coil (9) to selectively apply a controlling force to the armature plate (4) as the spring (3) moves the armature plate (4) between the hold position and the rest position along a path of travel; and b. controlling a second voltage applied to the brake armature coil (9) to minimize an impact of the armature plate (4) on the friction lining (5) when the spring (3) moves the armature plate (4) from the hold position to the rest position along the path of travel and controlling the second voltage in accordance with a predetermined velocity versus distance curve during movement of the armature plate from the hold position to the rest position.

16. The method according to claim 15 including the steps of:

c. generating a reference curve (30) for the movement of the armature plate (4) from the hold position to the rest position along the path of travel, the reference curve corresponding to the predetermined velocity versus distance curve;

d. generating a position signal representing an actual position of the armature plate (4) on the path of travel;

e. comparing the position signal with the reference curve to obtain a difference; and f. adjusting the second voltage applied to the brake armature coil (9) to minimize the difference.

17. The method according to claim 16 including a step of minimizing a magnitude of the position signal when the armature plate (4) is in the rest position.

18. The method according to claim 16 wherein the step c. is performed by generating an ideal speed versus distance curve (30) for the movement of the armature plate (4) from the hold position to the rest position along the path of travel, differentiating the ideal speed versus distance curve (30) to generate a net force versus distance curve (31), and subtracting a force applied by the spring (3) from the net force versus distance curve (31) to obtain a controlling force versus distance curve (32) as the reference curve (30).

19. The method according to claim 18 including a step of generating the reference curve (30) as a straight line approximation of the controlling force versus distance curve (32) having at least two straight line segments (33,34).

* * * * *